United States Patent
Jiang

(10) Patent No.: US 7,809,352 B2
(45) Date of Patent: Oct. 5, 2010

(54) METHOD FOR PROTECTING INFORMATION IN A MOBILE TERMINAL AND A MOBILE TERMINAL

(75) Inventor: Li Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 602 days.

(21) Appl. No.: 11/595,882

(22) Filed: Nov. 13, 2006

(65) Prior Publication Data

US 2007/0111728 A1    May 17, 2007

(30) Foreign Application Priority Data

Nov. 11, 2005   (CN) .................. 2005 1 0101367

(51) Int. Cl.
    *H04M 1/66* (2006.01)
(52) U.S. Cl. ..................... 455/410; 455/411
(58) Field of Classification Search .......... 455/410, 455/411, 434, 433, 432.1, 550.1, 403, 418, 455/419, 420

See application file for complete search history.

(56) References Cited

U.S. PATENT DOCUMENTS

| 6,741,851 | B1 | | 5/2004 | Lee et al. | |
|---|---|---|---|---|---|
| 7,360,078 | B1 | * | 4/2008 | Lebouill | 713/155 |
| 7,539,160 | B2 | * | 5/2009 | Virtanen et al. | 370/329 |
| 2004/0038668 | A1 | * | 2/2004 | Ho | 455/411 |
| 2005/0170811 | A1 | * | 8/2005 | Pelaez et al. | 455/410 |
| 2006/0293029 | A1 | * | 12/2006 | Jha et al. | 455/411 |

FOREIGN PATENT DOCUMENTS

| CN | 1645951 | 7/2005 |
|---|---|---|
| CN | 1645951 A | 7/2005 |
| CN | 1809097 | 7/2006 |
| KR | 10-2005-0078741 | 8/2005 |

OTHER PUBLICATIONS

International Search Report, issued in Corresponding International Patent Application No. PCT/CN2006/002561, dated on Feb. 8, 2007.

* cited by examiner

*Primary Examiner*—Jean A Gelin
(74) *Attorney, Agent, or Firm*—Conley Rose, P.C.; Grant Rodolph

(57) ABSTRACT

A mobile terminal and a method for protecting information in a mobile terminal, the method includes: sending an information protection command to a mobile terminal via current home mobile switching center of the mobile terminal; the mobile terminal receiving and decoding the command, and executing a protection operation on the information in the mobile terminal according to a protection range defined by the command. When the mobile terminal roams, an information protection command is sent to its current home mobile switching center via a home location register for the mobile terminal. When the mobile terminal is powered off, the command is stored in the home location register, and when the mobile terminal is powered on again and informs the home location register, the home location register sends the command. Thus, information to be protected in a mobile telephone may be deleted or locked via remote operation.

17 Claims, 6 Drawing Sheets

| 7 | 6 | 5 | 4 | 3 | 2 | 1 | 0 | Octet |
|---|---|---|---|---|---|---|---|---|
| Parameter Name ||||||||| 1 |
| Length ||||||||| 2 |
| Content 1 ||||||||| 3 |
| ... ||||||||| ... |
| Content n ||||||||| k |

Fig.4

METHOD FOR PROTECTING INFORMATION IN A MOBILE TERMINAL AND A MOBILE TERMINAL

FIELD OF THE INVENTION

The present invention relates to the field of communication, in particular, to a method for protecting information in a mobile terminal and a mobile terminal.

BACKGROUND OF THE INVENTION

With the continual development of modern mobile communication technology, mobile telephones have been widely used as a kind of convenient communication tool. The continual combination of mobile telephone technology, computer technology and the like makes a mobile telephone integrated with various functions, such as information storage function including address book, short message, notebook and memorandum, which play an important role in our daily life. Such information stored in a mobile telephone is usually personal privacy and it may be very important for the subscriber of the mobile telephone.

Because mobile telephones are small in volume, they are prone to be lost or stolen. When a mobile telephone of a subscriber is stolen or lost unfortunately, the subscriber may report the loss to a service provider via telephone or in a mobile business hall, so that unnecessary economic loss of call charge will be avoided. However, an implicit loss caused by the leakage of private information stored in the mobile telephone cannot be avoided. For example, short messages communicated with customers will leak out trade secret and business information, which will incur heavy economic loss of the subscriber.

SUMMARY OF THE INVENTION

The embodiments of the invention provide a method for protecting information in a mobile terminal and a mobile terminal, which may prevent the private information in a mobile terminal from leaking by remote control.

A technical solution according to an embodiment of the present invention is to provide a method for protecting information in a mobile terminal, which includes:

sending an information protection command to a mobile terminal via current home mobile switching center of the mobile terminal; and the mobile terminal receiving the information protection command and executing an operation indicated by the information protection command on the information in the mobile terminal according to a protection range defined by the information protection command, wherein the information protection command includes parameters for defining an information protection range.

When the mobile terminal is powered off, the information protection command is stored in a home location register for the mobile terminal, and when the mobile terminal is powered on again and informs the home location register, the home location register sends the information protection command.

The information protection range includes at least one of address book, short message, call record, notebook, memorandum, reminder note and other storage areas related to private information.

The information protection command includes at least one of an information delete command and an information lock command.

In the method, after the mobile terminal executes the protection operation, it returns a response of the operation result.

An embodiment of the invention further provides a mobile terminal, which includes:

a data storage unit, for storing information saved by a subscriber;

a signaling transceiving unit, for receiving an information protection command;

a signaling processing and execution unit, for decoding the information protection command received from the signaling transceiving unit, and executing an operation indicated by the information protection command on subscriber information stored in the data storage unit, wherein the information protection command includes parameters for defining an information protection range.

The data storage unit includes at least one of an address book storage area, a short message storage area, a call record storage area, a notebook storage area, a memorandum storage area and a reminder note storage area.

In the mobile terminal according to the embodiment of the invention, the information protection range includes at least one of address book, short message, call record, notebook, memorandum, reminder note and other storage areas related to private information. The information protection command includes at least one of an information delete command and an information lock command.

An embodiment of the invention further provides another method for protecting information in a mobile terminal, which includes:

sending an information protection command to a mobile terminal via a current home call session control function (CSCF) entity of the mobile terminal;

the mobile terminal receiving and decoding the information protection command, and executing an operation indicated by the information protection command on the information in the mobile terminal according to a protection range defined by the information protection command, wherein the information protection command includes parameters for defining an information protection range.

The method further includes: when the mobile terminal is powered off, the information protection command is stored in a home subscriber server for the mobile terminal, and when the mobile terminal is powered on again and informs the home subscriber server, the home subscriber server sends the information protection command.

The mobile terminal and the method for protecting information in the mobile terminal according to the embodiments of the invention may have the following beneficial effects: when a mobile terminal of a subscriber, such as a mobile telephone, is lost, or when information in a terminal needs to be remotely protected (the owner of the terminal cannot operate on it on site) for other reasons, a protection command may be sent to the remote mobile terminal via a maintenance and management system of a mobile switching center or a home location register, and information to be protected in the terminal may be deleted or locked, so that trouble and loss caused by information leakage will be avoided.

BRIEF DESCRIPTION OF THE DRAWINGS

FIG. 4 shows a structural diagram of parameters carried in an information delete command in an embodiment of the invention;

DETAILED DESCRIPTION OF THE INVENTION

The invention will now be further described in conjunction with the drawings and embodiments of the invention.

Figure 1:
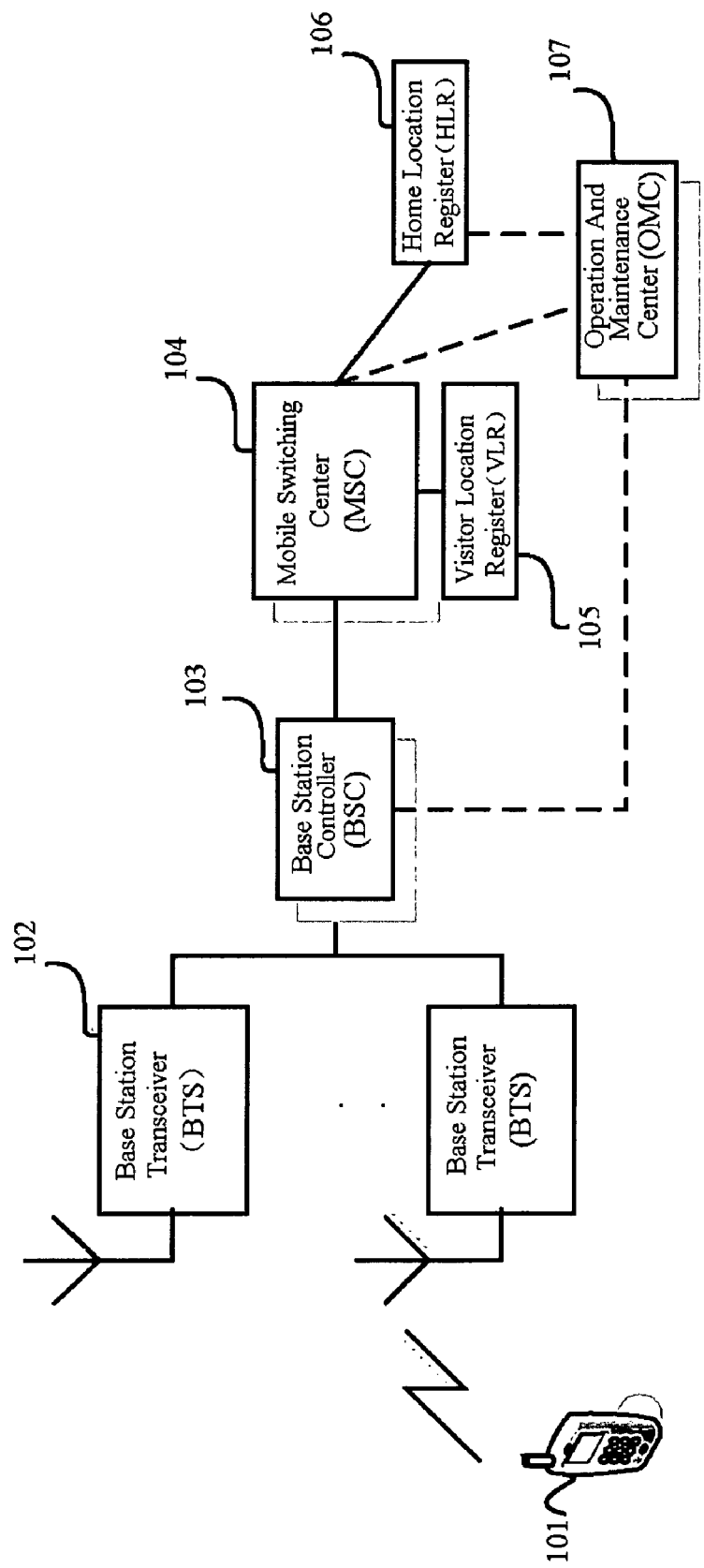
FIG. 1 shows a structural diagram of a communication network for realizing information protection in a mobile terminal according to an embodiment of the invention.

FIG. 1 shows a structural diagram of a communication network for realizing information protection in a mobile terminal according to an embodiment of the invention. As shown in FIG. 1, a typical mobile communication network (such as GSM network) mainly includes a mobile station, a base station subsystem, a mobile switching subsystem and an operation and maintenance center, etc. A mobile station, i.e. a mobile terminal 101 of a subscriber, may perform speech encoding, channel encoding, information encryption, information modulation and demodulation, and information transmitting and receiving. For example, in GSM communication system, mobile terminal 101 may be equipped with a Subscriber Identity Module (SIM) card, in which all of the information needed to authenticate a subscriber identity is stored. The mobile terminal 101 cannot access a network until a SIM card is inserted. However, the invention is not limited to such a communication system, and it can also be applied to other communication systems without using SIM cards (GSM system) or UIM cards (CDMA system), such as PHS(Personal handy-phone system) and various foreign communication systems without using subscriber cards. The base station subsystem mainly performs such functions as channel allocation in a coverage area, accessing and paging of a subscriber, and information transmission, etc. The base station subsystem includes a base station transceiver (BTS) 102 directly in communication with the mobile terminal 101 via a wireless interface, and a base station controller (BSC) 103 connected with a mobile switching center (MSC) 104, wherein the base station transceiver 102 is responsible for wireless transmission and the base station controller 103 is responsible for control and management. A base station subsystem usually includes a base station controller and one or more base station transceivers. The base station transceiver 102 may be connected directly with the base station controller 103, or it may also be connected with a remote base station controller via a base station interface equipment. The mobile switching subsystem performs communication switching function and manages a database needed by subscriber data and mobility at the same time. The mobile switching subsystem includes a mobile switching center (MSC) 104, a visitor location register (VLR) 105, a home location register (HLR) 106, an authentication center and an equipment identity register (not shown) etc. The mobile switching center 104 controls mobile terminal 101 within its coverage area, provides processing, control and bearer path for calls and services, and obtains all the data needed to process a subscriber call request from three databases, i.e., the visitor location register 105, the home location register 106 and the authentication center. Similarly, the mobile switching center 104 may update the above databases according to the latest data. The visitor location register 105 stores subscriber data related to the mobile terminals within a controlled area of the mobile switching center 104, wherein the subscriber data includes parameters such as subscriber number, location area information, subscriber status and services available to a subscriber. The visitor location register 105 is a dynamic subscriber database for storing necessary data obtained from the home location register 106 of a mobile subscriber. Once the mobile subscriber leaves a controlled area of the visitor location register, it will be registered in another visitor location register, and the previous visitor location register will cancel data record of the mobile subscriber. The home location register 106 mainly stores two kinds of information: parameters related to mobile subscribers, including such data as mobile subscriber identification number, accessibility, subscriber type, etc., and information related to current locations of mobile subscribers by which call routing to a mobile terminal may be established. Therefore, each mobile subscriber should be registered at its home location register. An operation and maintenance center (OMC) 107, which is provided with an OMC operating platform to realize the man-machine interface of the operation and maintenance center 107, manages the switching entities of the whole mobile communication system.

FIG. 1 shows a schematic diagram of a typical mobile communication network for implementing an embodiment of the invention. However, the invention is not limited to that. The mobile communication network includes various existing mobile communication networks, such as GSM, GPRS, CDMA etc., for example, a multimedia system based on IP shown in FIG. 6. The call session control function (CSCF) entity shown in FIG. 6 acts as a mobile switching center, while the home subscriber server (HSS) acts as an HLR. The messaging function between the CSCF and HSS entities keeps unchanged. In addition, the base station and the base station controller are not shown in FIG. 6, and the structure of a mobile access network under the IMS networking also keeps unchanged. FIG. 7 shows the structure of a communication network of a multimedia system based on IP for realizing information protection in a mobile terminal according to an embodiment of the invention, the principle of which is the same as that in FIG. 1 and will not be described in detail here. The mobile terminal according to the embodiment includes mobile telephone, SIP terminal, personal digital assistant (PDA), mobile business assistant and other handheld terminals that are capable of accessing a mobile communication network for mobile communication.

When a mobile terminal of a subscriber is lost, or when information in a terminal needs to be remotely protected (the owner of the terminal cannot operate on it on site) for other reasons, there exist three cases: the subscriber knows definitely that the terminal is within the home area (not roamed across mobile switching centers) and is powered on; the subscriber does not know whether his/her mobile terminal is within the home area; and the mobile terminal is powered off.

Figure 2:
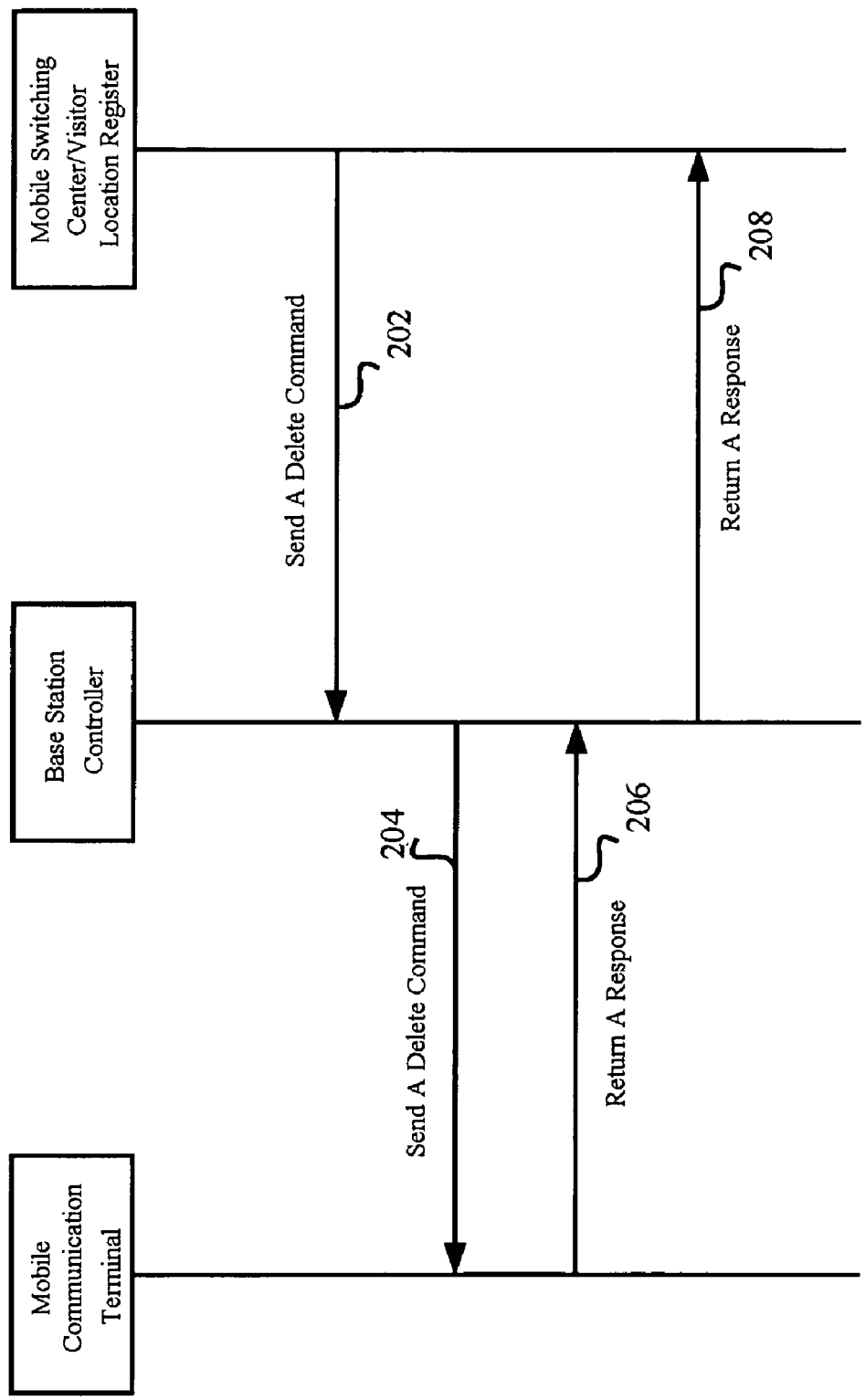
FIG. 2 shows a flow chart of the first embodiment of a method for protecting information in a mobile terminal according to the invention.

FIG. 2 shows a flow chart of a method for protecting information in a mobile terminal according to an embodiment of the invention in the first case. As shown in FIG. 2, when current home mobile switching center of the mobile terminal is known, the subscriber may send an information delete command to his/her mobile terminal via the mobile switching center, and the mobile terminal will delete related information therein based on the content of the command. The particular steps are as follows:

Firstly, the subscriber requests for a credible identity verification to an authentication center of the mobile communication network, which can be realized by various subscriber identifying methods in the prior art. For example, the subscriber may go to a business hall of the network service provider, and a staff member of the business hall may verify the subscriber identity by verifying the subscriber identity card and then operate via a man-machine platform of the operation and maintenance center. The subscriber may also employ a procedure similar to reporting the loss of a mobile telephone, that is, the subscriber may be verified through his/her service password via telephone.

Then in step 202, the mobile switching center sends an information delete command to the base station controller within its controlled area. The information delete command may contain parameters for defining an operation range of information delete, indicating which information to be deleted. For example, information stored in a mobile telephone, such as address book, short message record, call record, notebook, memorandum, reminder note, etc. and/or information stored in the SIM card of the subscriber, or one or a combination of more than one of the above items may be selected.

In step 204, after the base station controller receives the information delete command from the mobile switching center, it will modulate and transmit the information delete command to an air interface via one or more base station transceivers within its coverage area.

In step 206, the mobile terminal receives the information delete command via a corresponding air interface and deletes data within the specified range as indicated by the information delete command and the parameters contained therein. After the operation is performed, the mobile terminal returns a response message to the base station controller to indicate whether the operation succeeds.

In step 208, after the base station controller receives the response message via one or more base station transceivers connected with it, it passes the response message to the mobile switching center. Then, the mobile switching center may inform the subscriber of the operation response via the man-machine platform of the operation and maintenance center.

Figure 6:
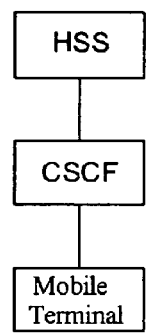
FIG. 6 shows an architecture diagram of a multimedia system based on IP according to an embodiment of the invention.
Figure 7:
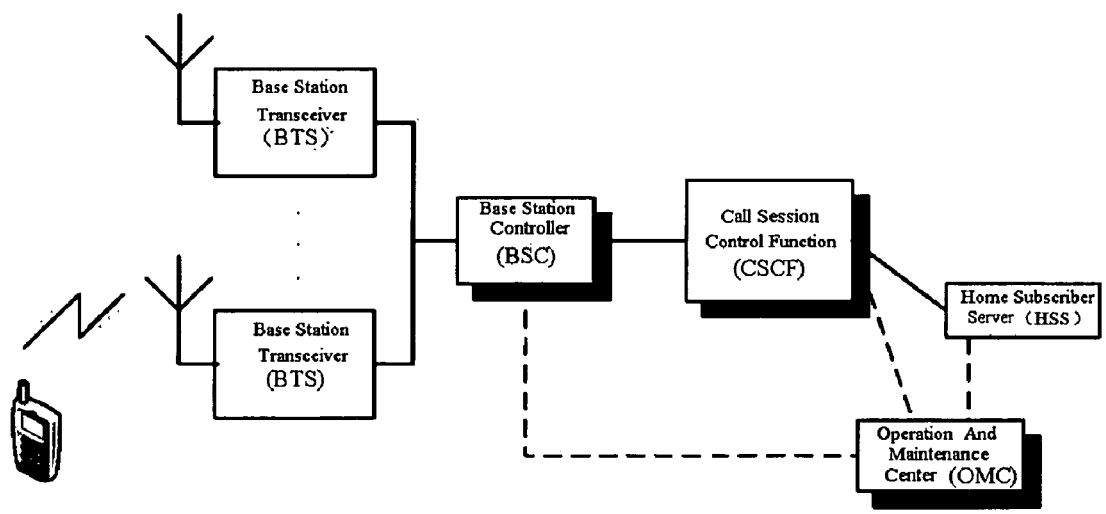
FIG. 7 shows a structural diagram of a communication network of a multimedia system based on IP for realizing information protection in a mobile terminal according to an embodiment of the invention.

If the embodiment is implemented in the network architecture shown in FIG. 6, the mobile switching center or the visitor location register of FIG. 2 will be replaced by the call session control function (CSCF) entity of FIG. 6.

Figure 3:
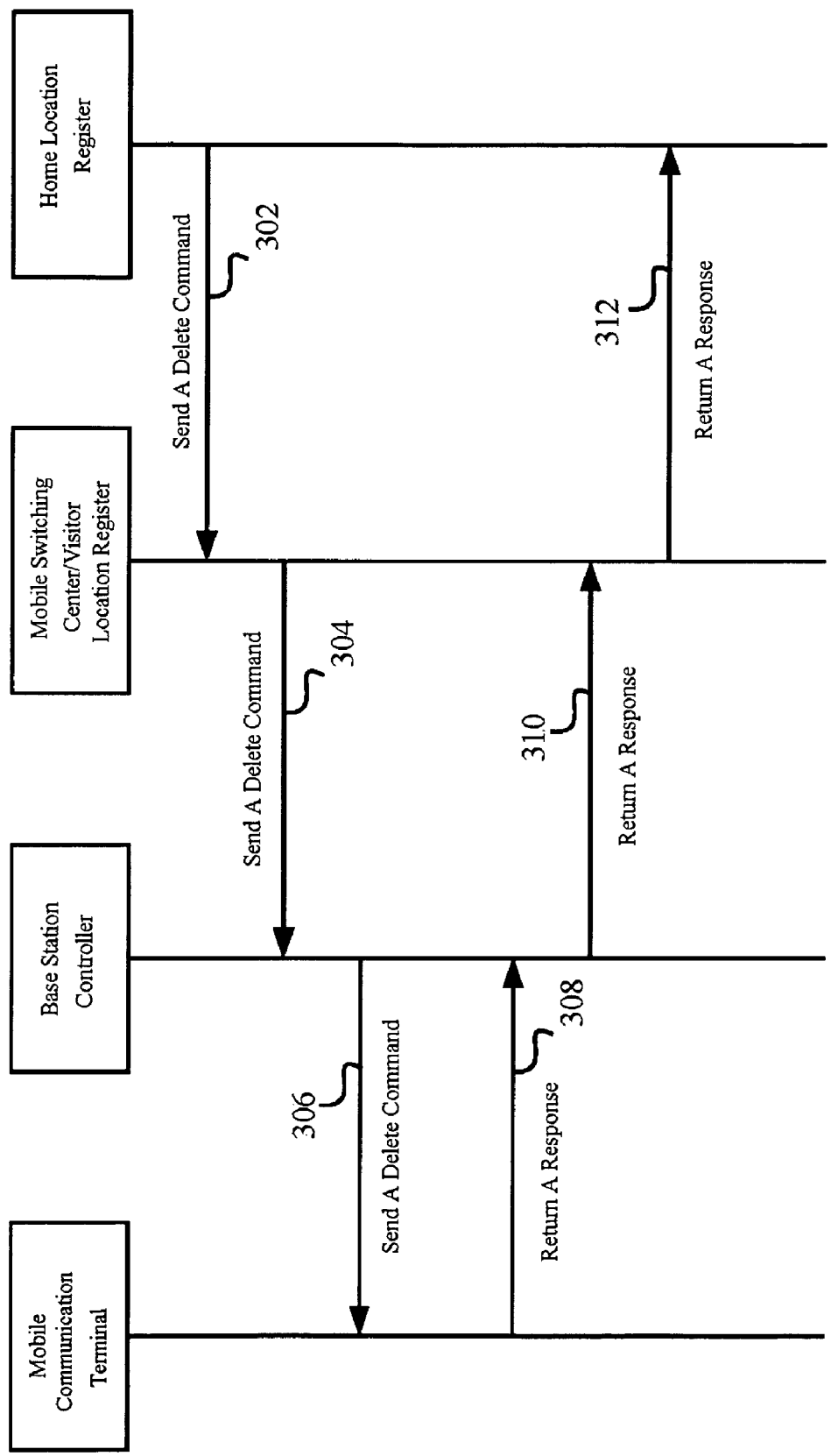
FIG. 3 shows a flow chart of the second embodiment of a method for protecting information in a mobile terminal according to the invention.

For the second case in which a mobile terminal roams across mobile switching centers, a flow chart of the method for protecting information in a mobile terminal according to an embodiment of the invention is shown in FIG. 3.

Firstly, in step 302, information of the current location and status of the mobile terminal needs to be obtained via a home location register, and an information delete command is sent to the current home mobile switching center of the mobile terminal via the home location register. The information delete command may contain parameters for defining an operation range of information delete, in which information to be deleted is indicated. For example, information stored in a mobile telephone such as address book, short message record, call record, notebook, memorandum, reminder note, etc. and/or information stored in the SIM card of the subscriber, or one or a combination of more than one of the above items may be selected.

Then in step 304, the current home mobile switching center of the mobile terminal transfers the information delete command to a base station controller of its controlled area.

In step 306, the base station controller transmits the information delete command received from the mobile switching center to an air interface via one or more base station transceivers within its coverage area.

In step 308, the mobile terminal receives the information delete command via a corresponding air interface and deletes data within the specified range as indicated by the information delete command and the parameters contained therein. After the operation is performed, the mobile terminal returns a response message to the base station controller to indicate whether the operation succeeds.

Then in step 310, after the base station controller receives the response message via one or more base station transceivers connected with it, it passes the response message to the mobile switching center.

In step 312, the current home mobile switching center of the mobile terminal passes the response message received from its base station controller to the home location register, and the home location register informs the subscriber of the operation response via the man-machine platform of the operation and maintenance center.

Similarly, if information protection is realized in the network architecture shown in FIG. 6 when a mobile terminal roams across mobile switching centers, the mobile switching center or the visitor location register of FIG. 3 should be replaced by the call session control function (CSCF) entity of FIG. 6, and the home location register of FIG. 3 should be replaced by the home subscriber server (HSS) of FIG. 6.

If a mobile terminal is powered off and cannot receive an information delete command when a subscriber requires to delete information in the mobile terminal, an "information delete" flag may be set in a corresponding location in a home location register, which indicates that the mobile terminal needs information protection, and at the same time, parameters and parameter contents related to the information delete command may be stored in the home location register. When the mobile terminal is powered on again, a location update procedure will be triggered and the current home mobile switching center of the mobile terminal will send a message to inform the home location register of the subscriber of the latest location and status of the mobile terminal. At this time, the home location register may start the above information delete operation based on the "information delete" flag and related parameters stored therein.

In the method for protecting information in a mobile terminal according to the embodiment, the information delete command sent to and received and executed by the mobile terminal contains parameters for defining a delete operation range. The parameters may be encoded in various ways. For example, the parameters may be in TLV format, that is, the parameters may comprise parameter name T, parameter length L and parameter content V. FIG. 4 shows one form of such a parameter, wherein Octet 1 refers to parameter name, Octet 2 refers to parameter length and Octet 3 to Octet k refer to parameter content. As a result, one or more contents may be included in the parameter. As for parameter "delete range", the length of parameter name may be 1 byte, or 3 bytes or the like. For example, it may be set as 0x01, or any other value, so long as it is different from the names of other existing parameters. The length of the parameter may be 0x02, which indicates that the length of the parameter is 2 bytes. It may also be defined longer, for example 3 bytes, so as to represent more parameter contents. The parameter content indicating a "delete range" may be represented by 2 bytes, for example:

| | | | |
|---|---|---|---|
| byte 1 | 0x01 Mobile Terminal Storage Area | 0x02 Subscriber Card Storage Area | ... |
| byte 2 | 0x01 Short Message Storage Area | 0x02 Address Book Storage Area | 0x03 Notebook Storage Area ... |

Parameter content may be in a more compact format or in any other format. For example, parameter content may be compressed in one byte.

The mobile terminal according to an embodiment of the invention mainly includes a signaling transceiving unit, a signaling processing and execution unit, and a data storage unit. The signaling transceiving unit is responsible for receiving a message from an air interface and passing the message command to the signaling processing and execution unit. It is also responsible for processing messages from the signaling processing and execution unit and sending the processed messages to an air interface via wireless signals. The signaling processing and execution unit is responsible for identifying an information delete command from the message received from the signaling transceiving unit, decoding the message, resolving the "delete range" parameter and contents of the parameter therein, performing data delete operation according to the contents of the parameter so as to delete corresponding information in the data storage unit, and creating a response message to be sent to a base station controller. The data storage unit is used to store data saved by the subscriber. the data storage unit includes a mobile terminal storage area and a subscriber card storage area in respect of physical entities for storing, and includes an address book storage area, a short message storage area, a call record storage area, a notebook storage area, a memorandum storage area, and a reminder note storage area, etc. in respect of the contents stored therein. Each storage area in the data storage unit may be added, deleted, modified, queried or locked, etc. After an operation is executed, an execution result will be returned to the invoker.

Figure 5:
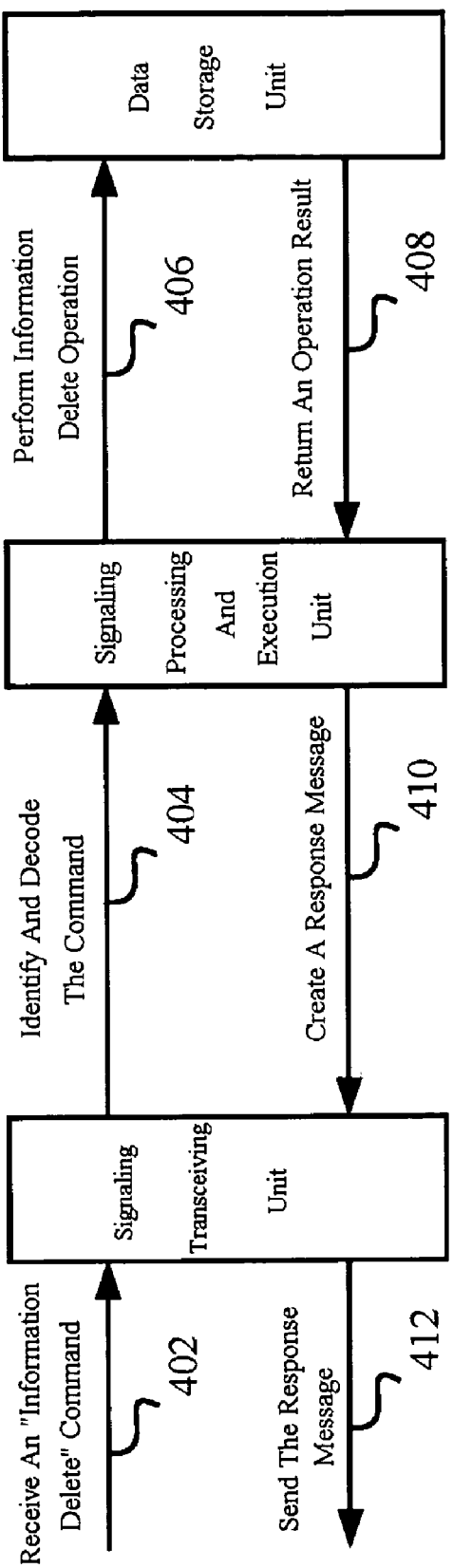
FIG. 5 shows a flow chart of information protection executed in a mobile terminal according to an embodiment of the invention.

FIG. 5 shows a flow chart of information protection executed in a mobile terminal according to an embodiment of the invention. As shown in FIG. 5, a particular operation flow in a mobile terminal is as follows:

In step 402, the signaling transceiving unit of the mobile terminal receives an information delete command in the form of wireless signal from a base station transceiver via an air interface, and demodulates the wireless signal. Various message contents are resolved and then passed to the signaling processing and execution unit.

In step 404, after the signaling processing and execution unit identifies the received message as an information delete command, it decodes the message and resolves a parameter "delete range" and the content of the parameter contained therein.

In step 406, the signaling processing and execution unit deletes data in specific storage areas of the data storage unit according to the content of the parameter "delete range". For example, a deleting operation range indicated in a two-byte parameter content "delete range" of the above example includes "address book storage area", "short message storage area" and "notebook storage area" of the "mobile terminal storage area" and the "subscriber card storage area", thus the signaling processing and execution unit will delete the contents of all address books, all short messages and all notebooks in the data storage unit as indicated by the parameter "delete range".

In step 408, after the deleting operation is performed, the data storage unit returns a data deletion result to the signaling processing and execution unit.

In step 410, the signaling processing and execution unit creates an information delete response message containing the operation result according to the deletion result, and passes the response message to the signaling transceiving unit.

In step 412, the signaling transceiving unit modulates the information delete response message created by the signaling processing and execution unit, and sends it to an air interface in the form of wireless signal.

In another embodiment of the invention, a subscriber may send an information lock command to his/her mobile terminal via a mobile switching center. The mobile terminal locks the related information therein according to parameter contents of the information lock command so as to prevent illegal access. The method for sending an information lock command and the method for processing the information lock command by a mobile terminal according to the embodiment are similar to those for the above information delete command. The information lock command contains parameters for defining a lock range, which can be encoded in similar ways to those for the above information delete command. The information lock command may be used in cases in which a subscriber cannot be sure whether his/her mobile terminal is lost indeed. If it is found out that the mobile terminal is not lost, the subscriber may operate on the mobile terminal to unlock it and regain access to related data. This can be realized in various ways of the prior art. If it is found out that the mobile terminal is lost indeed, then the subscriber may send an information delete command via the mobile switching center to permanently delete the related information in the mobile terminal.

It should be understood that the above detailed description of the particular embodiments is only illustrative of the present invention and should not be construed as limiting the scope of the invention which is defined by the appended claims.

What is claimed is:

1. A method for protecting information in a mobile terminal, comprising:
   sending a plurality of information protection commands to a mobile terminal via current home mobile switching center of the mobile terminal; and
   the mobile terminal receiving the information protection commands and executing an operation indicated by the information protection commands on the information in the mobile terminal according to a protection range defined by the information protection commands, wherein the information protection commands includes parameters for defining an information protection range;
   wherein the information protection commands comprise an information delete command and an information lock command;
   wherein the mobile terminal locks the information according to the information lock command; and
   wherein after receiving the information delete command, the mobile terminal deletes the information which was previously locked by the mobile terminal.

2. The method for protecting information in a mobile terminal according to claim 1, wherein, when the mobile terminal is powered off, the information protection commands are stored in a home location register for the mobile terminal, and when the mobile terminal is powered on again and informs the home location register, the home location register sends the information protection commands.

3. The method for protecting information in a mobile terminal according to claim 2, wherein the method further comprises: after the mobile terminal executes the protection operation, it returns a response of the operation result.

4. The method for protecting information in a mobile terminal according to claim 1, wherein the information protection range comprises at least one of address book, short message, call record, notebook, memorandum, reminder note and other storage areas related to private information.

5. The method for protecting information in a mobile terminal according to claim 4, wherein the method further comprises: after the mobile terminal executes the protection operation, it returns a response of the operation result.

6. The method for protecting information in a mobile terminal according to claim 1, wherein the method further comprises: after the mobile terminal executes the protection operation, it returns a response of the operation result.

7. The method for protecting information in a mobile terminal according to claim 1, wherein the information protection range comprises an address book, a short message record, a call record, a notebook, a memorandum, a reminder note, information stored on a SIM card, or combinations thereof 8. The method for protecting information in a mobile terminal according to claim 1, wherein the information protection range comprises some, but not all of: an address book, a short message record, a call record, a notebook, a memorandum, a reminder note, and information stored on a SIM card.

9. The method for protecting information in a mobile terminal according to claim 1, wherein the parameters for defining the information protection range are two bytes in length.

10. The method for protecting information in a mobile terminal according to claim 1, wherein the mobile terminal is in a home area and is powered on.

11. The method for protecting information in a mobile terminal according to claim 1, wherein a location of the mobile terminal is unknown to a user requesting execution of the operation.

12. The method for protecting information in a mobile terminal according to claim 1, wherein whether the mobile terminal is powered on or off is unknown to a user requesting execution of the operation.

13. A mobile terminal, comprising:
    a data storage unit, for storing information saved by a subscriber;
    a signaling transceiving unit, for receiving a plurality of information protection commands, wherein the information protection commands include parameters for defining an information protection range, the information protection commands comprise an information delete command and an information lock command; and
    a signaling processing and execution unit, for decoding the information protection commands received from the signaling transceiving unit, and executing an operation indicated by the information protection commands on subscriber information stored in the data storage unit, wherein the signaling processing and execution unit locks the information according to the information lock command, and deletes the information which was previously locked by the mobile terminal after receiving the information delete command.

14. The mobile terminal according to claim 13, wherein the data storage unit comprises at least one of an address book storage area, a short message storage area, a call record storage area, a notebook storage area, a memorandum storage area and a reminder note storage area.

15. The mobile terminal according to claim 13, wherein the information protection range comprises at least one of address book, short message, call record, notebook, memorandum, reminder note and other storage areas related to private information.

16. A method for protecting information in a mobile terminal, comprising:
    sending a plurality of information protection commands to a mobile terminal via a current home call session control function (CSCF) entity of the mobile terminal; and
    the mobile terminal receiving and decoding the information protection commands and executing an operation indicated by the information protection commands on the information in the mobile terminal according to a protection range defined by the information protection commands, wherein the information protection commands includes parameters for defining an information protection range;
    wherein the information protection commands comprise an information delete command and an information lock command;
    wherein the mobile terminal locks the information according to the information lock command; and
    wherein after receiving the information delete command, the mobile terminal deletes the information which was previously locked by the mobile terminal.

17. The method for protecting information in a mobile terminal according to claim 16, wherein when the mobile terminal is powered off, the information protection commands are stored in a home subscriber server for the mobile terminal, and when the mobile terminal is powered on again and informs the home subscriber server, the home subscriber server sends the information protection commands.

* * * * *